United States Patent [19]
Hiyokawa et al.

[11] Patent Number: 6,047,235
[45] Date of Patent: Apr. 4, 2000

[54] VEHICULAR NAVIGATION SYSTEM

[75] Inventors: Toyoji Hiyokawa; Yusuke Takenaka; Takeshi Yanagikubo, all of Anjo, Japan

[73] Assignee: Aisin AW Co., Ltd., Anjo, Japan

[21] Appl. No.: 08/871,756

[22] Filed: Jun. 9, 1997

[30] Foreign Application Priority Data

Jul. 26, 1996 [JP] Japan ................................. 8-198171

[51] Int. Cl.[7] ............................................. G06F 165/00
[52] U.S. Cl. .......................... 701/201; 705/25; 705/206; 705/208; 340/988; 340/990
[58] Field of Search .................................. 701/201, 206, 701/208, 209, 210, 211, 212, 214, 23, 25; 340/988, 990, 995

[56] References Cited

U.S. PATENT DOCUMENTS

| | | | |
|---|---|---|---|
| 5,041,983 | 8/1991 | Nakahara et al. | 701/209 |
| 5,752,217 | 5/1998 | Ishizaki et al. | 701/209 |
| 5,757,289 | 5/1998 | Nimura et al. | 701/209 |
| 5,774,828 | 6/1998 | Brunts et al. | 701/208 |

*Primary Examiner*—William A. Cuchlinski, Jr.
*Assistant Examiner*—Gertrude Arthur
*Attorney, Agent, or Firm*—Oliff & Berridge, PLC

[57] ABSTRACT

The invention provides a vehicular navigation system which is capable of lowering the cost of detecting road data stored in order in the outgoing trip, using the road data as resources in the return trip, and determining a route meeting the requirements of the user. According to a vehicular navigation system of the invention, when a vehicle is traveling on a road having bidirectional data along an outgoing route from a starting point to a destination, a road on the opposite side of the road on which the vehicle is traveling is stored as return route data with a lowered cost of route determination. Such a storing operation is performed for each node passed by the vehicle. The return route data thus stored are used to determine a return route.

12 Claims, 9 Drawing Sheets

INTERSECTION DATA

| NUMBER (k) OF INTERSECTIONS | |
|---|---|
| 1 | INTERSECTION NUMBER |
| | INTERSECTION NAME |
| | SIGNAL DATA |
| | CROSSWALK DATA |
| | CROSSROAD FEATURE DATA |
| | DATA ON NARROWER ROAD TO BE ENTERED |
| | DATA ON WIDER ROAD TO BE ENTERED |
| | LANDMARK DATA |
| ⋮ | ⋮ |
| k | |

FIG. 8

| OUTGOING ROUTE | RETURN ROUTE |
|---|---|
| ROAD 1a | ROAD 1b |
| 6a | 6b |
| (9) | (10) |
| (13) | (14) |
| (16) | (17) |
| ⋮ | ⋮ |

FIG. 10

| | OUTGOING ROUTE | RETURN ROUTE |
|---|---|---|
| A | 101 | 102 |
| B | 108 | 109 |
| C | 110 | OFF |
| D | 115 | OFF |
| E | 121 | OFF |
| F | 126 | 127 |
| G | 130 | 133 |
| ⋮ | ⋮ | ⋮ |

VEHICULAR NAVIGATION SYSTEM

The entire disclosure of Japanese Patent Application No. 8/198171 filed on Jul. 26, 1996 including specification, drawings, and abstract is incorporated herein by reference in its entirety.

BACKGROUND OF THE INVENTION

1. Field of Invention

The invention relates to a vehicular navigation system.

2. Description of Related Art

Conventionally, a variety of navigation systems have been proposed.

For example:

(1) According to a route guidance method for a vehicular navigation system disclosed in Japanese Patent Laid-Open No. Hei 7-320194, for instance, a plurality of nodes passed by a vehicle during the period from the time when a registration start key is depressed at a starting point to the time when a registration end key is depressed at a destination in an outgoing trip are stored in order in a memory device. The nodes thus passed are reversed in order, thereby forming guidance route data for a return trip. If the memory device has two nodes stored for a certain point along the outgoing route as a result of deliberate deviation therefrom, one of the two nodes is deleted. Then, a return route with no deviation is determined simply by interchanging the starting point and destination from the outgoing trip.

(2) Another conventional technology disclosed in Japanese Patent Laid-Open No. Hei 134796 relates to a route determination and display system in which a current position on a map of a vehicle or the like is displayed on a display unit, more specifically, to a system in which an outgoing route to a destination and a return route therefrom are determined and displayed. In this system, when the route determining operation is requested, the outgoing route from the starting point to the destination is determined and displayed on the map. Then, the return route is determined by interchanging the starting point and destination from the outgoing trip. The return route is displayed upon receipt of an instruction to display it.

In the above-described route guidance method (1), a plurality of nodes passed by the vehicle in the outgoing trip are registered in order, and the nodes thus registered are reversed in order to determine the return route. However, there may be a one-way road or the like where the vehicle is allowed to pass in the outgoing trip but not in the return trip. Accordingly, the vehicle may not be guided appropriately in the return trip merely by reading the nodes passed in the outgoing trip in reverse order.

Furthermore, in the case where the vehicle reaches a first-set destination with the nodes passed during the outgoing trip registered, moves around the destination without setting any specific route and returns to the starting point, the vehicle cannot be guided in the return trip unless it returns to the route whose nodes have been passed and registered during the outgoing trip.

In the above-described system (2), the destination in the outgoing trip is set as the starting point in the return trip, while the starting point in the outgoing trip is set as the destination in the return trip. Thus, the return route is determined and registered in advance. Consequently, it is unnecessary to perform any operation to determine the return route, once the vehicle has reached the destination in the outgoing trip.

However, it is to be noted herein that the return route is automatically determined once the starting point and the destination in the outgoing trip have been determined. That is, the return route is determined as an optimum route simply by interchanging the starting point and the destination in the outgoing trip without taking into consideration any specific information relating to the outgoing route. In the case where the vehicle deviates from an initially-determined route in the outgoing trip, the outgoing route is determined again automatically or by a user of the system at a point where such deviation is recognized, and the vehicle is guided along a new route, the new route is not taken into consideration at all in determining the return route.

If the user makes a trip to an unknown place to achieve a particular purpose and returns to a first starting point, it is convenient to pass the outgoing route again. This is because road conditions of the outgoing route, which has been already covered, are recognized by the user. In the case of a navigation system wherein the route to a destination is determined in advance based on a starting point or a current position of a vehicle and wherein the route guidance is given at intersections or crossroads by sound or screen display, if the system determines that the vehicle has been traveling along a wrong route, it is desirable to determine a new route from a current position of the vehicle.

In this case, it is desirable to display a key to urge the user to start the route determining operation again, so that the new route from the current position of the vehicle can be determined by depressing the key.

Furthermore, the vehicle traveling along a predetermined route may desirably take a partial detour off the original route or adopt a totally different route in response to an instruction given by the user to determine a new route.

For some reason or based on a personal preference, the user may go off the original route intentionally and instruct the system to determine or edit a different route. If the user who is familiar with an area around the starting point wants to avoid a constantly-congested trunk road along the predetermined route, for example, a new route is edited by starting the route determining operation again. The route thus edited, though different from an initially-determined optimum route, is preferred by the user. Therefore, the user requires the same route to be followed in the return trip.

However, such requirements by the user cannot be satisfied by the conventional technologies disclosed by (1) and (2).

SUMMARY OF THE INVENTION

It is thus an object of the invention to provide a vehicular navigation system which is capable of lowering the cost of detecting road data stored in order in the outgoing trip, using the road data as resources in the return trip, and determining a route meeting the requirements of the user.

In order to achieve the above-described object, according to a first aspect of the invention, a road currently passed by a vehicle is recognized during an outgoing trip along an outgoing route from a starting point to a destination. Then, data on a return route corresponding to the currently passed road along the outgoing route are obtained during the outgoing trip, and the data thus obtained are stored. Then, the return route is determined by using the cost-lowered data thus stored upon request for return route guidance.

According to a second aspect of the invention, a road currently passed by a vehicle is first recognized during an outgoing trip along an outgoing route from a starting point to a destination. If data on the recognized road along the outgoing route are bidirectional, data on a road on the opposite side of the recognized road are obtained. On the other hand, if data on the recognized road along the outgoing route are not bidirectional, data on a road within a predetermined area around the recognized road are obtained. Then, the data thus obtained are stored for a return trip. Finally, a return route is determined by using the cost-lowered data thus stored upon request for return route guidance.

According to a third aspect of the invention, the road within the predetermined area may be located within a predetermined distance from the recognized road currently passed by the vehicle, and an angular difference between both the roads may be within a predetermined value.

Furthermore, a vehicular navigation system according to a fourth aspect of the invention includes information storage means for storing road data, input means for setting a destination and a starting point, current position detection means for detecting a current position of a vehicle, storage means for temporarily storing data on route, route determination means for determining a route from the starting point input by the input means or the current position detected by the current position detection means to the destination input by the input means by using the road data stored in the information storage means, and control means for conducting route guidance based on the route determined by the route determination means and the current position detected by the current position detection means and for storing data on a return route in the storage means based on an outgoing route currently passed by the vehicle. In this navigation system, the control means recognizes the road currently passed by the vehicle as the outgoing route based on the current position detected by the current position detection means and the road data stored in the information storage means, obtains road data on a return route corresponding to road data on the outgoing route, and stores the road data on the return route in the storage means. In addition, the route determination means reads the road data on the return route from the storage means and performs a route determining operation by using the cost-lowered data thus read.

According to a fifth aspect of the invention, if data on the recognized road along the outgoing route are bidirectional, data on a road on the opposite side of the road currently passed by the vehicle are obtained by the control means, whereas if data on the recognized road along the outgoing route are not bidirectional, data on a road within a predetermined area around the recognized road are obtained by the control means. Then, the data thus obtained are stored in the storage means as data on a return route.

According to a sixth aspect of the invention, the road within the predetermined area may be located within a predetermined distance from the recognized road currently passed by the vehicle, and angular difference between both the roads may be within a predetermined value.

BRIEF DESCRIPTION OF THE DRAWINGS

The invention will be described with reference to the drawings in which:

FIG. 8 is a diagram showing a route data string according to an embodiment of the invention;

FIG. 10 is a diagram showing a route data string according to another embodiment of the invention.

DETAILED DESCRIPTION OF PREFERRED EMBODIMENTS

Hereinafter, preferred embodiments of the present invention will be described with reference to the accompanying drawings.

Figure 1:
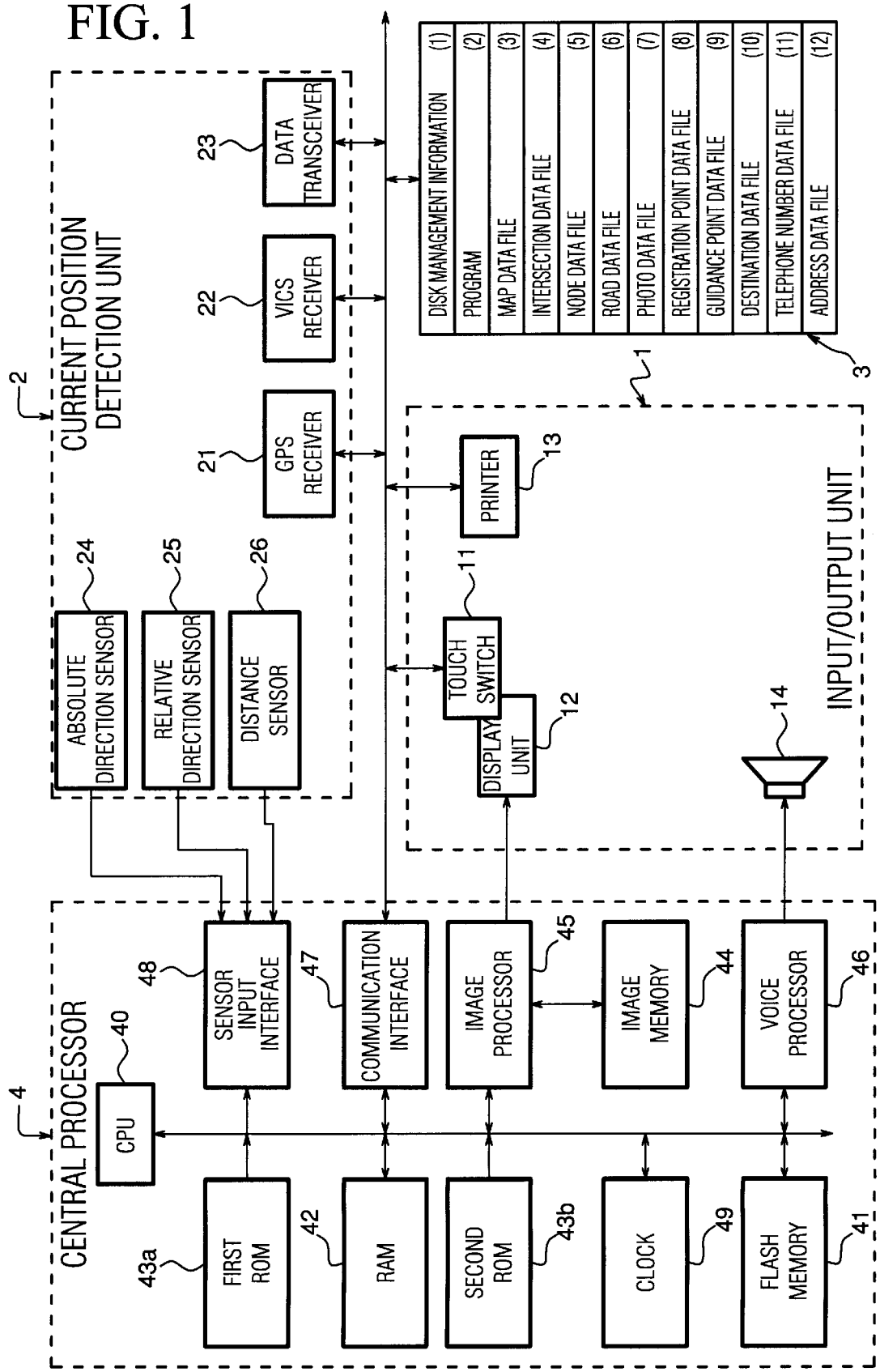
FIG. 1 is a diagram showing a general structure of a vehicular navigation system according to an embodiment of the invention.

As shown in FIG. 1, a vehicular navigation system according to the invention includes an input/output unit 1 for inputting/outputting information relating to route guidance, a current position detection unit 2 for detecting or receiving information relating to current position of a vehicle of a user, an information storage unit 3 for storing navigation data necessary for route determination and audio-visual guidance data and programs (OS and/or application) necessary for route guidance, and a central processor 4 for processing the audio-visual guidance data necessary for route determination and route guidance and controlling the whole system. First, we will describe how each component is structured.

The input/output unit 1 instructs the central processor 4 to perform navigation processing in response to the user's request, so that a destination is input, the guidance information by audio and/or visual means is output and the processed data are printed out. To perform such operations, an input section has a touch switch 11 or a control switch that inputs a telephone number or coordinate on a map of a destination or requests route guidance. An input unit, such as remote controller or the like, may of course be used instead.

An output section, on the other hand, includes a display unit 12 for displaying input data or route guidance automatically on a screen at the request of the user, a printer 13 for printing out data processed in the central processor 4 or stored in the information storage unit for the central processor 4, and a speaker 14 for producing audio outputs of route guidance.

This system may additionally include a voice recognition unit permitting an audio input, and a card reader for reading data recorded in an IC card or a magnetic card. Also, a data communication unit can be added for exchanging data with an information source, such as a personal computer, in which map data, destination data or other data specific to the user are stored.

The display unit 12 includes a color CRT or a color liquid crystal display unit for displaying in color all the screens necessary for navigation, such as a route setting screen, a section drawing screen, and an intersection drawing screen, based on the guidance data or the map data processed by the central processor 4. The display unit 12 also displays buttons for setting route guidance on the screen, guiding the route or switching the screen. Especially, information on intermediate intersections, such as their names, is displayed in color from time to time in a popped-up window on the route section screen.

The display unit 12 is mounted in an instrument panel in the vicinity of a driver's seat. The user is able to confirm the current position of the vehicle by checking the map on the display unit 12 and obtain information on the route to follow. Also, the display unit 12 is provided with a touch switch (input unit) 11 corresponding to displayed function buttons. The above-described operation can be performed based on signals input by touching the buttons. The input signal generating means, including the buttons and the touch switch, makes up the input section, which will not be described herein in any further detail.

The current position detection unit 2, which detects or receives information on the current position of the vehicle, includes an absolute direction sensor 24 having a geomagnetic sensor or the like; a relative direction sensor 25 having a steering sensor, a gyro or the like; a distance sensor 26 for detecting distance covered based on the number of revolutions of wheels; a GPS receiver 21 using a satellite navigation system (GPS); and a VICS receiver 22 making up a traffic information acquisition means or a data transceiver 23. The VICS receiver 22 receives road traffic information through FM multiplexing, a radio beacon or a light beacon. The data transceiver 23 is a portable telephone or a personal computer, for example, and is used to exchange information necessary for navigation with a traffic information center (such as ATIS), at the request of the user.

The information storage unit 3 is an external memory unit having an external storage medium, such as a CD-ROM (hereinafter simply referred to as a CD), an optical CD or an IC card, for storing a navigation program and data. The navigation program includes a map drawing section, a route determination section, a route guidance section, a current position calculating section and a destination setting operation control section. The navigation program also includes an application section and an OS section for processing navigation signals, in which a program for executing the route determining operation and other processes, a program for controlling display outputs necessary for route guidance and voice outputs necessary for voice guidance, data necessary for such guidance, and display information data necessary for route guidance and map display are stored. Furthermore, the stored data include map data, intersection data, road data, various guidance data and all other data necessary for navigation.

Specifically, the information storage unit 3 has stored therein a program for setting a destination and intermediate points based on position information from the current position detection unit 2 and input signals from the input unit 11 and performing a route determining operation using the road data, a program for changing the detected road data and re-executing the route determining operation in the case where the vehicle deviates from the route, a program for drawing, map matching and determining voice output timing and voice phrases along the route, and a program for changing the currently-followed road data to the return route data, storing the same data and executing the route determining operation by reading the stored return route data and changing the route determination cost in the case where the previous starting point is selected as a destination. Various operations of the navigation system according to the invention are performed by driving these programs stored in the information storage unit 3. In other words, according to this embodiment, the programs for performing the operations of the invention are stored in the information storage unit 3 as an external storage medium.

The central processor 4 includes a CPU 40 for performing various calculating operations and a flash memory 41 for reading and storing programs from and to CD's in the information storage unit 3. The flash memory 41 allows the existing CD programs to be erased and rewritten collectively, even if the programs are modified. The central processor 4 also includes a first ROM 43*a* having stored therein a program (program reading means) for checking and updating the programs of the flash memory 41, a RAM 42 for temporarily storing route guidance information, such as geographical coordinates of a set destination, road code numbers and the data under calculation, and a second ROM 43*b* for storing display information data necessary for route guidance and map display. The above-mentioned updating program may be stored in an external storage unit.

The programs according to the invention and other programs for executing the navigation process may be all stored in a CD as an external storage medium. Also, the programs may be entirely or partially stored in the ROM (second ROM 43*b*) on a main body of the system. The data and programs stored in the external storage medium are input to the central processor of the navigation system as external signals and processed, thus performing various navigation operations.

Furthermore, the central processor 4 includes an image memory 44 for storing image data used for screen display on the display unit 12, an image processor 45 for retrieving image data from the image memory, processing and outputting it to the display unit 12 in accordance with display control signals from the CPU 40, a voice processor 46 for synthesizing voices, phrases, complete sentences, sound or the like read from the RAM 42, converting them into analog signals and outputting them to the speaker 14 in accordance with the voice output control signals from the CPU 40, a communication interface 47 allowing communication systems to exchange input/output data, a sensor input interface 48 for retrieving sensor signals of the current position detection unit 2, and a clock 49 for recording date and time into internal dialog information.

In the central processor 4, when data obtained by the sensors of the current position detection unit 2 are retrieved by the sensor input interface 48, the CPU 40 calculates a current position coordinate based on the retrieved data and writes it temporarily into the RAM 42 at regular time intervals. The current position coordinate is obtained by map matching, taking detection errors of various sensors into consideration. Also, the output values of the various sensors are subjected to constant correction. The route guidance is displayed on the screen and output in voice, with the presence or absence of the voice output being selected by the user.

Figure 2:
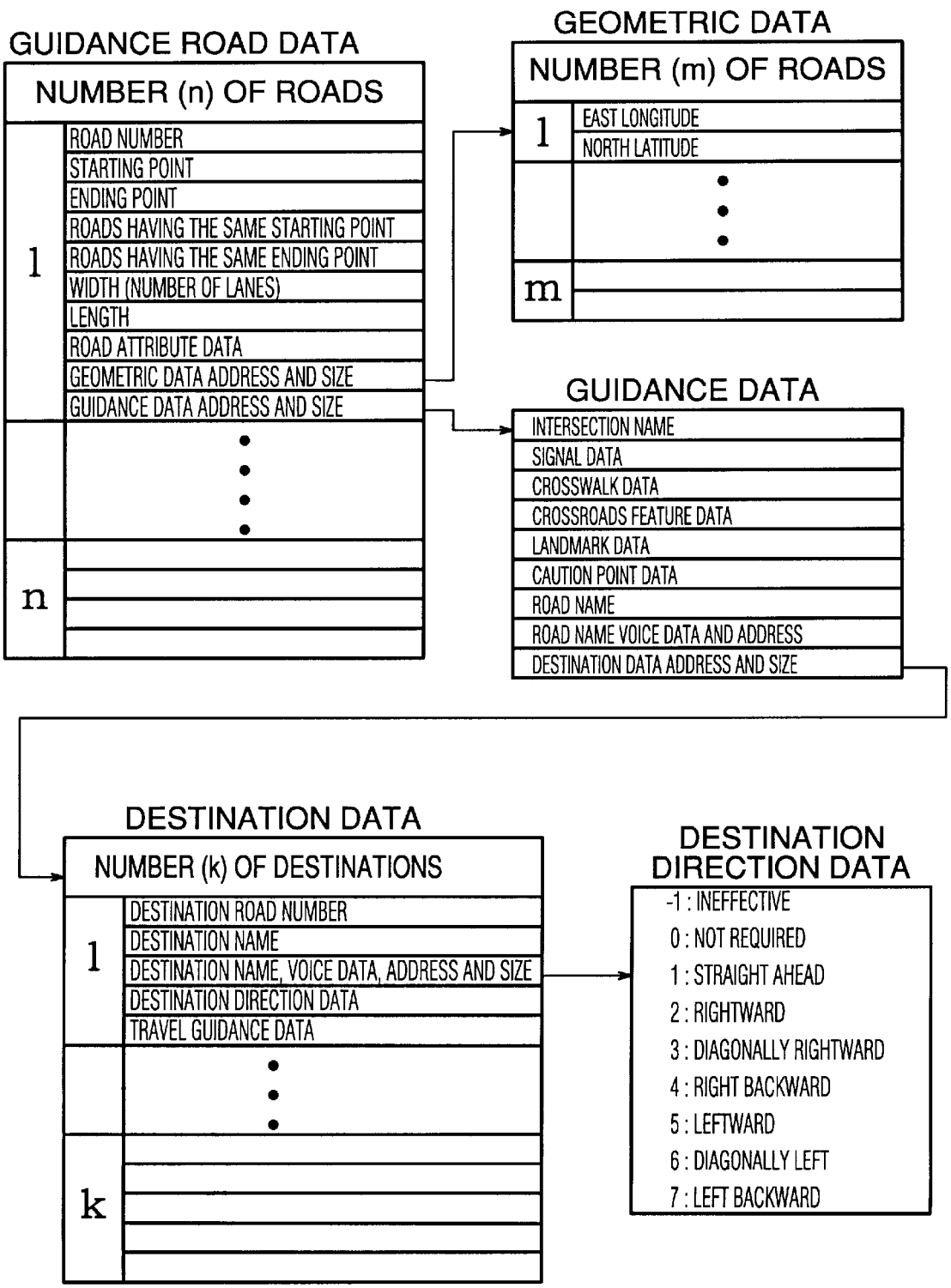
FIG. 2 is a diagram showing a structure of road data of a vehicular navigation system according to the invention.

FIG. 2 shows a road guidance data file, in which data necessary for the route calculation means to calculate a route and guide the vehicle along the route are stored. The road data file includes, for each of n roads, road number, length, road attribute data, address and size of geometrical data, and address and size of guidance data. The road number is set for the outgoing and return routes separately, for each road section between adjacent crossroads. The road attribute data indicate whether a particular road is a viaduct, a side of a viaduct, an underground road or a side of an underground road. In addition, the road attribute data also include information on the number of lanes. The geometrical data include coordinates having appropriate longitude and latitude of each of m nodes, into which each road may be divided.

The guidance data include names of intersections (or crossroads), the presence or absence of a traffic signal, the presence or absence of a cross walk, crossroads features and landmarks (traffic signs, and signs of filling stations and convenience stores for example), caution points (information on railway crossings, tunnel inlets or outlets, or narrowed road points), road names (road type information such as toll roads, ordinary roads (national routes, prefectural routes, etc.)), aural address and size of the road names, and address and size of the destination data. The destination data include road number for destination, destination name, aural address and size of the destination name data, destination direction data, and traveling guidance data (right, left or central lane). The destination direction data indicate whether the same data are ineffective (or unused) or not requested (the vehicle is not guided by the same data), and whether the vehicle should travel straight ahead, rightward, diagonally rightward, right backward, leftward, diagonally leftward or left backward.

Figures 3, 4:
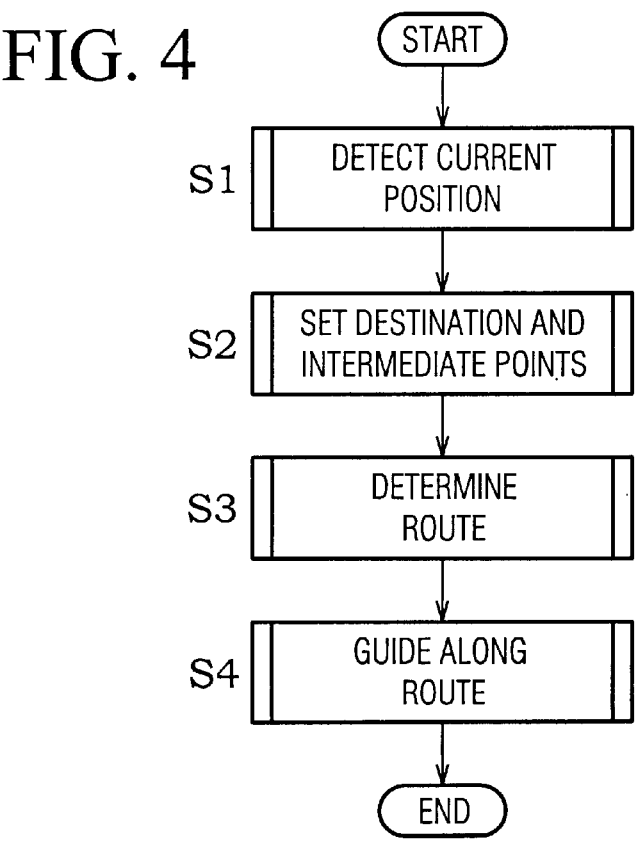
FIG. 3 is a diagram showing intersection data of a vehicular navigation system according to the invention.
FIG. 4 is a flowchart showing flow of the processing for the vehicular navigation system according to the invention.

Although the data structure shown in FIG. 2 stores road data and information relating to intersections, as shown in FIG. 3, the intersection data may be separated from the road data to include information on presence or absence of a traffic signal or information on connecting roads. However, if information on connecting roads is included in the road data, it is easy to add data, such as a "do not enter" sign for prohibiting the vehicle from entering a certain road from a certain road. Moreover, since the data on connecting roads are included in the road data, data capacity can be reduced significantly.

Hereinafter the overall processing flow of the navigation system of the invention will be described with reference to FIG. 4.

First, a current position (starting point) necessary for route determination is obtained by the current position detection means (step 1).

Then, conditions for setting a destination point and intermediate points are input through the input unit 1 on the destination and intermediate point setting screen, thereby setting the destination point and any intermediate points (step S2).

Then, a route from the current position to the destination point and through the intermediate points is determined by the route determination means (step S3).

Then, the guidance start key of the input unit is depressed along the route determined, thereby starting route guidance. Subsequently, the current position of the vehicle is iteratively detected by the current position detection means during movement, so that the current position can be followed and route guidance is displayed or aurally produced at an intersection or crossroads where the vehicle is required to turn to the left or right (step S4).

Now, vehicular navigation according to an embodiment of the invention will be explained in detail with reference to FIG. 5.

First, a destination is set (step S11). Then, it is checked whether the destination set in step S11 is a previous starting point (step S12).

If the set destination is the previous starting point, it is checked whether the route determining conditions have been changed, that is, whether priority should be given to a toll road, whether there is any specific road of personal preference to be selected, and the like (step S13). If the route determining conditions have not been changed, a route determining cost is changed based on return route data (step S14). This process will be described in detail later.

The intermediate points are set (step S15) and, then, it is checked whether a starting point is to be set (step S16). If the answer in step S16 is YES, the starting point is set (step S17). The starting point as set in this step is different from the current vehicle position. This is the case where a route guidance starting point, such as the nearest interchange is selected on the assumption that the user is versed in the neighborhood of the current position and route guidance is unnecessary.

If the answer in step S16 is NO, on the other hand, the current position is set as a starting point (step S18). Then, a route from the starting point set in step S17, or the current vehicle position set in step S18, to the destination set in step S11 is determined (step S19). In this process, the route determined should include any intermediate points.

The current position is followed (step S20) once movement of the vehicle commences. The route guidance is then carried out based on the current vehicle position (step S21).

In step S22, a process for obtaining return route data is executed. Then, until the destination is reached, steps S20 to S22 are repeated (step S23). If it is determined in step S20 that the current vehicle position is off the route, the route is determined again automatically or in accordance with a manual instruction of the user, though not described in detail.

The flowchart (subroutine) of the process for obtaining the return route data, that is, step S22 of FIG. 5, will be explained in detail with reference to FIG. 6.

First, in step S31, a current position is detected. Then, a road along which the vehicle is currently traveling and the direction in which it is currently traveling are identified (step S32). This process is executed using well-known map matching techniques.

Figure 7:
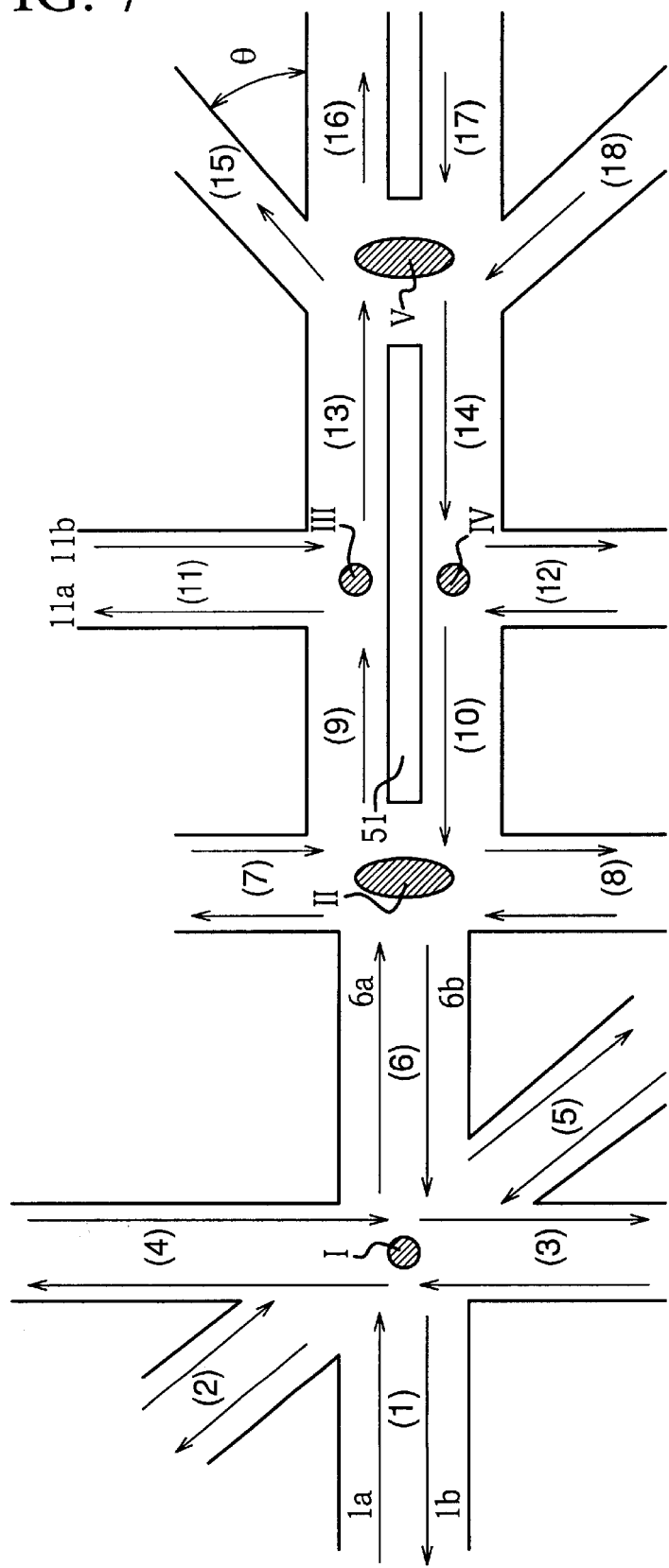
FIG. 7 is a diagram showing a specific example route according to an embodiment of the invention.

Then, it is checked whether the road data currently obtained, that is, for the road being transited, are bidirectional (step S33). In FIG. 7, for example, a road (1) lacking a median strip 51 is shown. In this case, bidirectional data (directions 1a and 1b) are stored in a single road datum (road data (1)).

When the answer in step S33 is NO, the currently obtained road data contain no data in the opposite direction. That means the vehicle is currently traveling on a one-way or divided road. Therefore, an attempt is made to find a road within a predetermined distance and within a predetermined angular difference (step S34). In step S35, it is checked whether a corresponding road is available as a result of route determining operation of step S34.

If there is available a corresponding road, data on the road are obtained as data on the return route with a lowered cost (step S36) and the process proceeds to step S38.

When the answer in step S33 is YES, data in the opposite direction to the obtained road are obtained and the process proceeds to step S38 (step S37).

When the answer in step S35 is NO, the process also proceeds to step S38.

In step S38 a check is made whether the obtained road data are already registered, that is, already listed or stored.

If it is determined in step S38 that the obtained road data are not already registered, the obtained road data are stored in the RAM 42 as the return route data (step S39).

Then, it is checked whether a predetermined time has passed (step S40). The predetermined time is a travel time in which processing is not needed and minimizes the amount of processing required. It may be equated to a travel distance at a given speed, determined based upon experience, or even omitted as a step.

It will be described, for example, how to process the return route data obtained in the process of FIG. 6 with reference to FIG. 7, in which road data structure (road data links) are shown in a simplified form.

In FIG. 7, road numbers of the road data stored in the information storage unit 3 are designated by numerals (1), (2) and so on, while intersection numbers of the intersection data by numerals I, II and so on. Since roads (1), (6), (11), for example, do not have a median strip 51, bidirectional data (directions 1a and 1b) are stored in a single road datum (in the road data (1)). Furthermore, roads (9), (10), (13), (14), on the other hand, represent roads in which lanes cannot be changed, that is, turns are not permitted so the direction of travel can not be reversed, due to the presence of a median strip 51 or for some other reason. Thus, the roads (9) and (10), which represent opposite directions, are separately stored as one-way road data.

It will be described below as to the case where the route (outgoing route) is preset in the order of (1) (1a) to (6) (6a) to (9) to (13) to (16).

Since the road (1) is a two-way road, the direction 1b is regarded as return route data when the vehicle is traveling in the direction 1a so that the data are stored in the RAM 42 with a lowered cost of route determination.

Then, when the road (6) is indicated in the course of route guidance at the intersection I (intermediate point), since road (6) is also a two-way road, the direction 6b is regarded as return route data when the vehicle is traveling in the direction 6a on the road (6). The data are stored in the RAM 42 with a lowered cost.

When the route (9) is indicated in the course of route guidance at the intersection II (intermediate point), since the road (9) is a one-way road constituting part of a bidirectional road having a median strip 51, the road (10) in the opposite direction nearest to the road (9) is regarded as return route data. The data are stored in the RAM 42 with a lowered cost of route determination.

When the road (13) is indicated in the course of route guidance at the intersection III (intermediate point), since the road (13) is also a one-way road constituting part of a bidirectional road having a median strip 51, the road (14) in the opposite direction nearest to the road (13) is regarded as return route data and the data are stored in the RAM 42 with a lowered cost of route determination.

Then, when the road (16) is indicated in the course of route guidance at the intersection V (intermediate point), since the road (16) is also a one-way road, the road (17) extending in the opposite direction and forming a smallest possible angle with the road (16) is regarded as return route data. Then, the data are stored in the RAM 42 with a lowered cost of route determination.

In this manner, the data for determining the return route nearest to the outgoing route are stored with a lowered cost of route determination in the outgoing trip. Thus, the return route data are obtained between respective intermediate points, that is, for each node.

A series of route data in FIG. 7 are represented in a chart shown in FIG. 8. According to this chart, the roads 1a-6a-(9)-(13)-(16) and so on constitute the outgoing route, whereas the roads (17)-(14)-(10)-6b-1b constitute the return route. In this case, a series of data on the return route are obtained while the vehicle is traveling along the outgoing route with a lowered cost of route determination.

Alternatively, the one-way road as mentioned above may be a freeway or toll road that is vertically divided into two parts.

Figure 9:
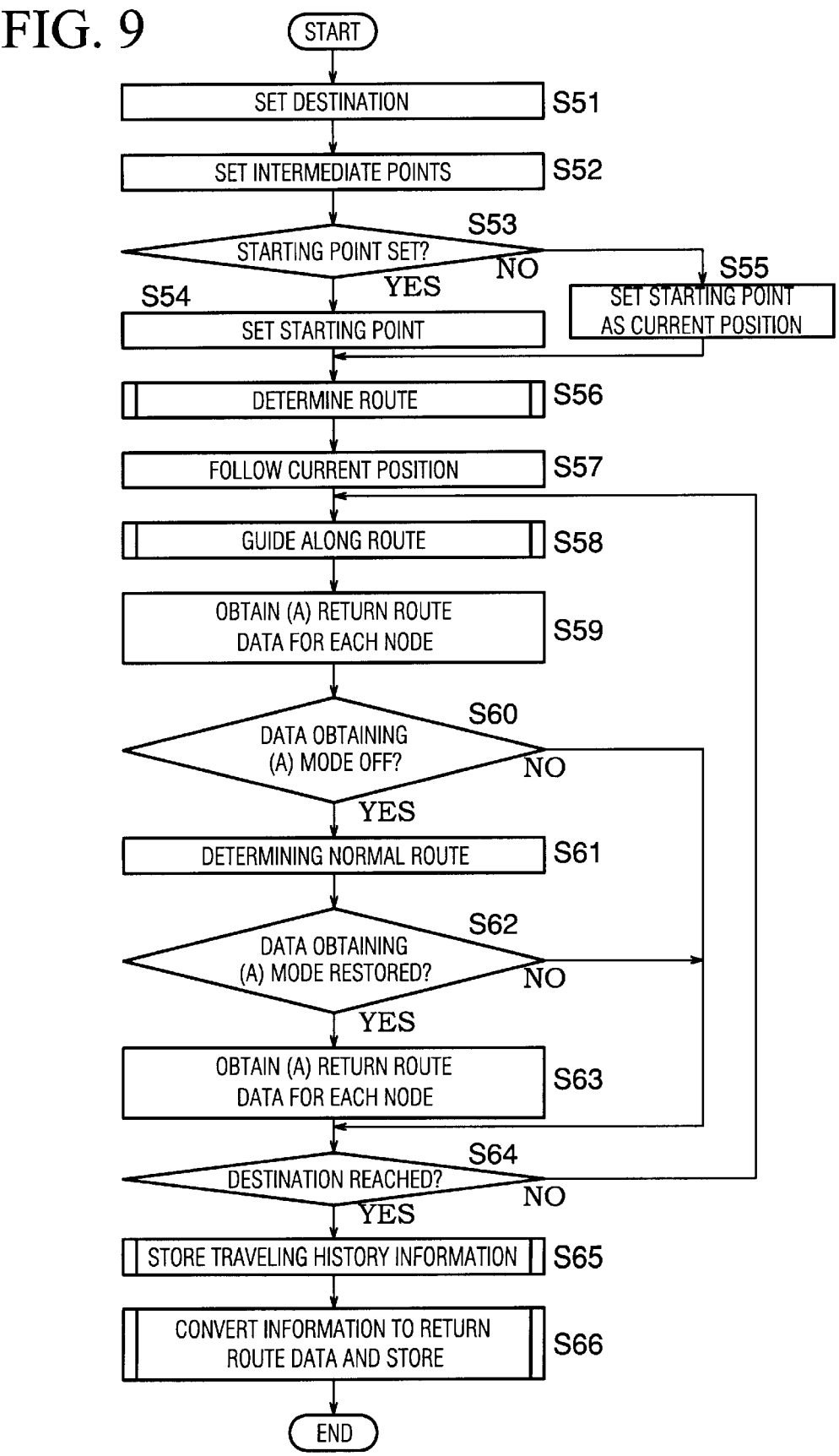
FIG. 9 is a navigation flowchart showing another embodiment of the invention.

Hereinafter, a second embodiment of the invention will be explained. FIG. 9 is a navigation flowchart showing this second embodiment of the invention.

First, a destination is set (step S51) . Then, intermediate points are set (step S52). It is then checked whether a starting point is to be set (step S53). When the answer in step S53 is YES, the starting point is set (step S54).

When the answer in step S53 is NO, on the other hand, a current position is set as the starting point (step S55).

Then, route determining operation is performed (step S56). The current position is tracked during movement (step S57) and route guidance is carried out (step S58).

Along the way, the return route data are obtained for each node (step S59).

It is then checked whether a storage mode (A) for storing return route data for each node is to be turned off (step S60) . Specifically, if the user selects a route which he or she does not want to follow on the return trip, that is, if the user wants to deviate from the outgoing route, the input/output unit 41 is operated to turn off the storage mode (A).

When the storage mode (A), for storing return route data for each node, is turned off, the vehicle keeps traveling based on a normal route determining operation and no return route data are stored (step S61). If the answer in step S60 is NO, the process proceeds to step S64.

Then, if the vehicle wants to enter the outgoing route again, after having deviated from the original route, to obtain return route data, it is checked whether the storage (A) mode for storing return route data for each node is to be restored (step S62). If the answer in step S62 is YES, the return route data are obtained again for each node (step S63).

In such a case, the vehicle keeps traveling towards its destination. The above-mentioned steps are repeated until the destination is reached (step S64).

Then, the above-described traveling history information is used to determine the return route. In this case, route determining operation is performed as to an off-route section, in which the vehicle deviated from the original outgoing route (step S65).

In step S66, the data are converted into return route data and stored.

According to a chart shown in FIG. 10, in the case where the traveling history stored as outgoing route data includes road A as 101, road B as 108, road C as 110, road D as 115, road E as 121, road F as 126, road G as 130 and so forth. While proceeding along this outgoing route, return route data are stored with a lowered cost of route determination. In the return route included are road A as 102, road B as 109, road C as OFF (off-route), road D as OFF (off-route), road E as OFF (off-route), road F (return to the original route) as 127, road G as 133 and so forth. In this embodiment, if the user does not want to use part of the data as return route data, such part is marked with OFF while the vehicle is traveling along the outgoing route. Alternatively, the return route data can be partially deleted after route guidance has been terminated in the outgoing trip.

In determining the route, an optimum route is determined based on link information and cost information. There are a variety of route determining methods proposed, which include a method of combining road strings in a tree from destination and determining the least expensive branch as optimum route, a method of selectively connecting the least expensive intersections sequentially from destination, a method of dividing data into blocks and zeroing in on a block to be determined in advance, and a method of providing data in a rough-dense hierarchical structure and making a search upward in levels from both starting point and destination.

Figure 6:
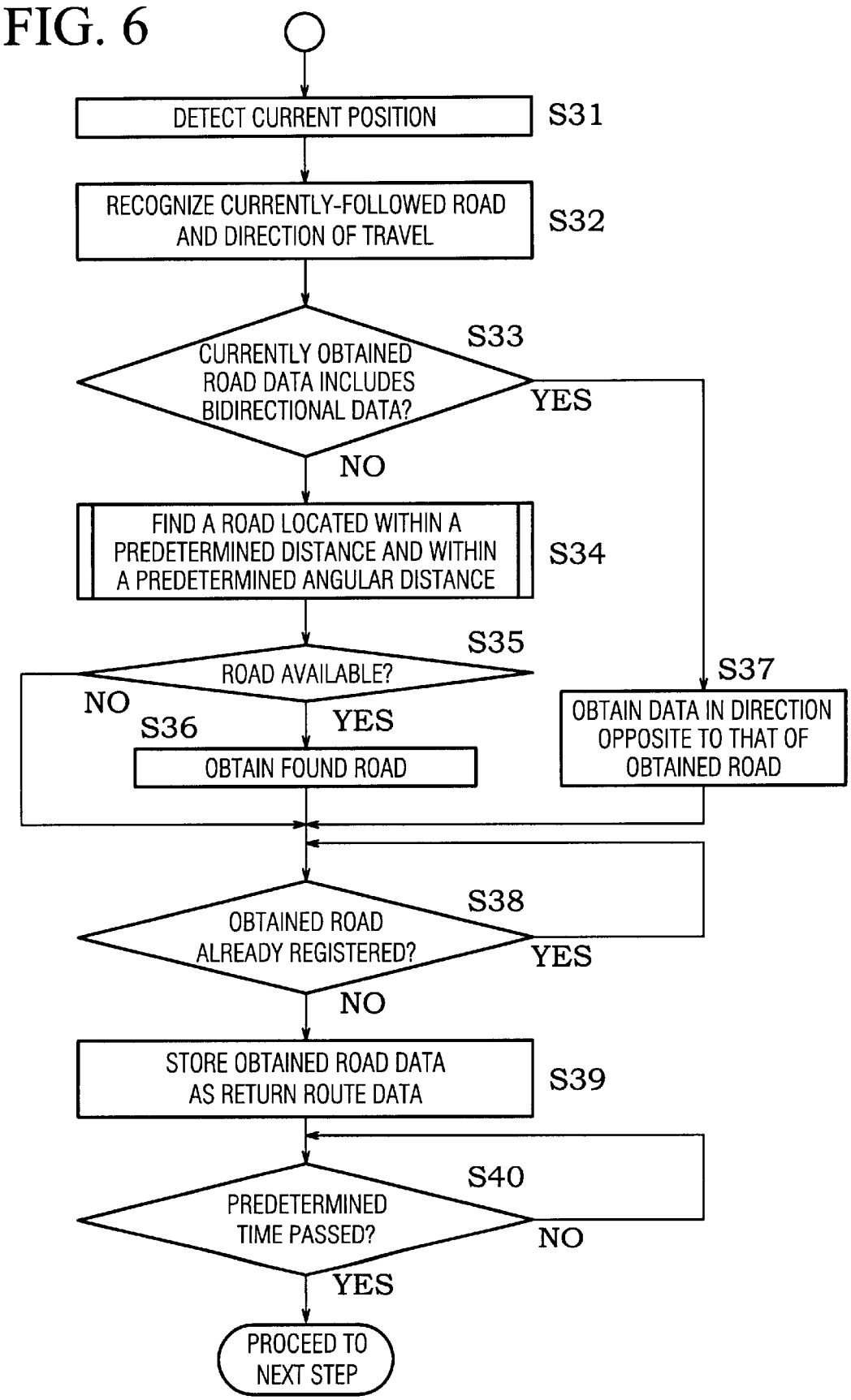
FIG. 6 is a flowchart for obtaining return route data according to an embodiment of the invention.

As a method of route determination in step S34 in FIG. 6, for example, a predetermined area is set based on coordinates of the starting and ending points of the currently traveled road during the outgoing trip. A road within the predetermined distance is identified. A road having an angular difference with the currently traveled road that is generally diverging from the currently traveled road in the direction of travel, or converging with the return route, is selected. If the road under such comparison is a one-way road, the direction thereof is also taken into consideration. For example, if the vehicle is traveling on road 16 (FIG. 7), and road 17 does not exist, then roads 15 and 18 would be identified as potential return roads as being within the predetermined distance of road 16. However, road 15 is a one-way road in the wrong direction, i.e. it diverges from road 16 currently being traveled. Thus, road 18 would be identified as the return road.

As a method of setting a predetermined area from the currently-obtained road, a rectangular area or a circular area of a predetermined radius is set about the coordinates of the starting point or the ending point of the road data. Alternatively, a rectangular area or a circular area of a predetermined radius may be set about the coordinate of a current vehicle position.

Furthermore, as a method of finding a road having an angular difference with the currently-obtained road, an attempt is made to find those forming with the currently-followed road an angle of 180°±a. In this method, the angle of the currently-obtained road may be stored in road data in advance. If the road data include intersections as a starting point and an ending point, then the section between the starting point and the ending point is divided and stored according to node coordinates based on road geometry. Thus, the coordinate points between which the vehicle is currently located is determined, so that the inclination between two particular nodes can be used as a particular angle.

Figure 5:
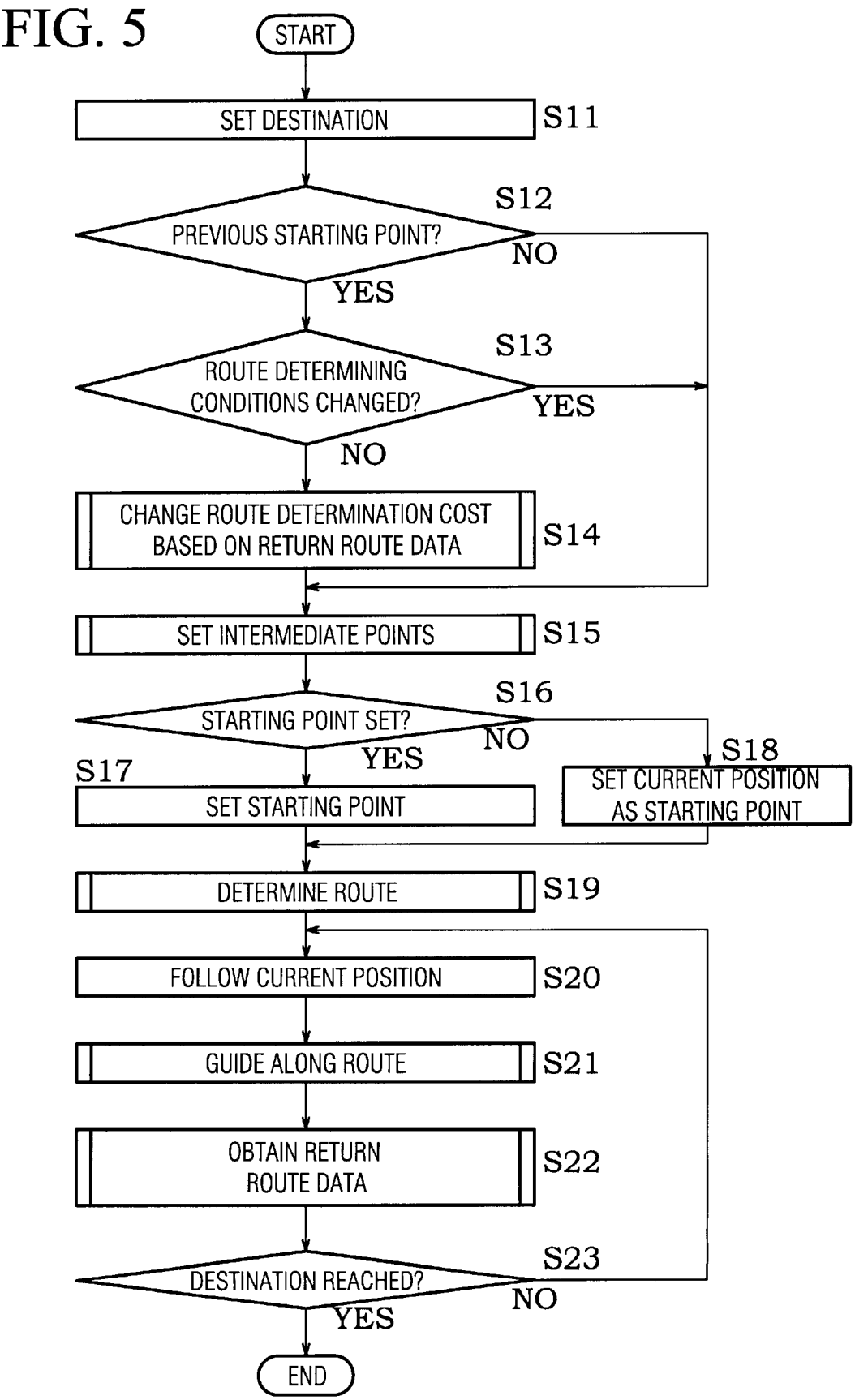
FIG. 5 is a flowchart for vehicle navigation according to an embodiment of the invention.

Although return route data are sequentially stored during the outgoing trip according to the embodiment as shown in FIGS. 5 and 6, route data obtained in the outgoing trip may be extracted and converted into the return route data after route guidance has been terminated in the outgoing trip. In the case where outgoing route data are converted into the return route data, if it is determined that the vehicle has traveled without deviating from an initially-determined route, the return route data are obtained from the outgoing route data. This is also true with the case when the vehicle is traveling along an initially-determined route, another route is determined and this route is followed.

If the vehicle has deviated from the initially-determined route while automatic repetitive route determination mode is entered, the route up to a deviation point is connected to a route newly determined. Then, the routes thus connected are registered as an outgoing route. When manual repetitive route determination mode is entered, the route determining operation is performed repetitively at the request of the user. In this case, if the vehicle has traveled for a while without performing the route determining operation again after having deviated from the route, the route up to a deviation point is connected to the route from a point at which the route determining operation is again performed. Then, the routes thus connected are registered as an outgoing route.

In addition, according to a system wherein traffic information is received from VICS while traveling along a certain route and the route determining operation is performed repetitively based on information on traffic density, route portions where the route determining operation is newly performed based on traffic information are stored. When a vehicle traveling along an initially-determined route detects traffic congestion in front of its current position and performs the route determining operation again to avoid specific portions of the route, the initially-determined route is registered as an outgoing route. This is because the traffic congestion may be reduced or gone by the time a user who has reached his or her destination and coped with necessary affairs starts to return.

Furthermore, although in the above-described embodiment, it is determined in step S12 of FIG. 5 whether the input destination is the previous starting point, a menu display screen for setting destination may include a key like "PREVIOUS STARTING POINT" to allow the user to select the coordinate of the starting point in the previous route guidance as a destination. Alternatively, the previous starting point coordinate may be registered. In this case, if a certain area around the coordinate is input as a destination, it is determined that the previous starting point has been input. Specifically, a rectangular area or a circular area having a predetermined radius is defined about the previous starting point. If the input destination is located within that specific area, it is determined that the previous starting point has been set as the destination.

In the process for changing route determination cost based on return route data in step S14 of FIG. 5, the road data stored in advance to calculate the cost at the time of route determination includes road length, road width and road attributes. In changing the return route data, the road cost based on the data stored in advance is multiplied by a predetermined value or reduced by a predetermined value, thereby lowering the cost.

In the above-mentioned embodiments, the cost of the return route data obtained while traveling along the outgoing route is lowered so that the return route is determined upon request for return route guidance. However, in order to quicken the process for determining return route, return route data obtained in the outgoing trip may be connected to each other in advance so that they can be used upon request for return route guidance. In this case, if the vehicle has traveled along a one-way road during the outgoing trip so that return route data are partially disconnected despite the process of step S34 of FIG. 6, the return route determining operation may be performed such that the disconnected portions are connected.

As hitherto described, the navigation system of the invention is advantageous in that a vehicle making a round trip between a starting point and a destination can be guided along substantially the same route as an outgoing route during the return trip, to the greatest possible degree. In particular, if a user causes the system to perform an equivalent route editing operation to determine again an optimum route in the initial route determining operation and follows a route of personal preference, this route of personal preference is taken into consideration when determining the return route. In addition, if the return route determining operation is requested at a point distant from the destination of the outgoing trip, the return route can be determined such that the outgoing route is followed to the greatest possible degree. Furthermore, the invention is resourceful in that data on the return route corresponding to data on the outgoing route are stored in advance, resulting in significant reduction in costs and time for determining the return route.

While the invention has been described with reference to what is presently considered to be preferred embodiments thereof, it is to be understood that the invention is not limited to the disclosed embodiments or structure. To the contrary, the invention is intended to cover various modifications and equivalent arrangements included within the spirit and scope of the appended claims.

What is claimed is:

1. A method used by a vehicular navigation system, comprising the steps of:
    recognizing a road currently passed by a vehicle during an outgoing trip along an outgoing route from a starting point to a destination;
    obtaining data on a return route back to the starting point based on the currently passed road along the outgoing route during the outgoing trip;
    lowering a cost of the return route data, the cost being a weight given to data used in determining routes, wherein the system chooses the route with the lowest cost;
    storing the data thus obtained; and
    determining the return route upon operator request for return route guidance by using the cost-lowered data thus stored.

2. A method used by a vehicular navigation system, comprising the steps of:
    identifying a road currently passed by a vehicle during an outgoing trip along an outgoing route from a starting point to a destination as return route data, the return route being the route back to the starting point, wherein when data on the recognized road along the outgoing route are bidirectional, obtaining return route data on a road on the opposite side of the recognized road, and when data on the recognized road along the outgoing route are not bidirectional, obtaining return route data on a road within a predetermined area around the recognized road;
    lowering a cost of the return route data, the cost being a weight given to data used in determining routes, wherein the system chooses the route with the lowest cost;
    storing the data thus obtained for the return route; and
    determining the return route upon operator request for return route guidance by using the cost-lowered data thus stored.

3. The vehicular navigation system according to claim 2, wherein the road within said predetermined area is located within a predetermined distance from the recognized road currently passed by the vehicle, and an angular difference between both the road and the recognized road is within a predetermined value.

4. A vehicular navigation system for a vehicle, comprising:
    information storage means for storing road data;
    input means for setting a destination and a starting point;
    current position detection means for detecting a current position of the vehicle;
    storage means for temporarily storing data on route;
    route determination means for determining a route from one of the starting point input by said input means and the current position detected by said current position detection means to the destination input by said input means by using the road data stored in said information storage means; and
    control means for conducting route guidance based on the route determined by said route determination means and the current position detected by said current position detection means and for storing data on a return route in said storage means based on an outgoing route currently passed by the vehicle, wherein said control means recognizes the road currently passed by the vehicle on the outgoing route based on the current position detected by said current position detection means and the road data stored in said information storage means, obtains road data for a return route corresponding to road data for the outgoing route, lowers a cost of the return route data, the cost being a weight given to data used in determining routes, wherein the system chooses the route with the lowest cost, and stores the road data for the return route in said storage means and said route determination means reads the road data on the return route from said storage means and performs a route determining operation by using cost-lowered data thus read.

5. The vehicular navigation system according to claim 4, wherein when data on the recognized road along the outgoing route are bidirectional, data on a road on the opposite side of the road currently passed by the vehicle are obtained by said control means and when data on the recognized road along the outgoing route are not bidirectional, data on a road within a predetermined area around the recognized road are obtained by said control means, and the data thus obtained are stored in said storage means as data for the return route.

6. The vehicular navigation system according to claim 5, wherein the road within the predetermined area is located within a predetermined distance from the recognized road currently passed by the vehicle, and an angular difference between both the road and the recognized road is within a predetermined value.

7. A navigation method for a vehicle, comprising the steps of:
    identifying a start point;
    identifying a destination;
    determining an outgoing route from the start point to the destination, the outgoing route comprising at least one segment;
    monitoring a current position of the vehicle;
    obtaining road data of the segment current segment corresponding to the current position of the vehicle while traveling on the outgoing route;
    determining a return segment corresponding to the current segment;
    checking whether the return segment was previously determined; and
    storing the return segment if not previously identified as part of a return route.

8. The navigation method according to claim 7, further comprising the steps of:
    deactivating the determining a return segment step; and
    reactivating the determining a return segment step, the deactivating step executed when an operator does not desire to return over the return segment corresponding to the current segment being traversed and the reactivating step executed when the operator desires to return over the return segment corresponding to the current segment being traversed.

9. The navigation method according to claim 8, further comprising the steps of:
    activating the return route; and
    completing the return route by searching road data when return segments are missing from the return route.

10. The navigation method according to claim 7, wherein the step of determining a return segment comprises the steps of:

determining whether the road data of the segment corresponding to the current position of the vehicle is a bidirectional road segment; and when the segment is a bidirectional road segment, returning to the checking the return segment step, and when the segment is not a bidirectional road segment, performing a step of developing a return route segment.

11. The navigation method according to claim 10, wherein the step of developing a return route segment comprises the steps of:

obtaining data for a road within a predetermined distance from the segment corresponding to the current position of the vehicle; and checking whether an allowed direction of travel is within a predetermined angular distance; and returning to the checking the return segment step.

12. The navigation method according to claim 7, further comprising the steps of:

activating return route navigation;

redesignating one of the destination and the current position of the vehicle as the return start and the start point as the return destination; and constructing a return route from the stored return segment data commencing with a segment adjacent to the return start.

* * * * *